United States Patent
Angsutrarux

(10) Patent No.: US 10,344,912 B1
(45) Date of Patent: Jul. 9, 2019

(54) SUPPORTING DEVICE

(71) Applicant: Nattarat Angsutrarux, Bangkok (TH)

(72) Inventor: Nattarat Angsutrarux, Bangkok (TH)

(*) Notice: Subject to any disclaimer, the term of this patent is extended or adjusted under 35 U.S.C. 154(b) by 0 days.

(21) Appl. No.: 16/175,846

(22) Filed: Oct. 31, 2018

Related U.S. Application Data

(60) Provisional application No. 62/700,784, filed on Jul. 19, 2018.

(51) Int. Cl.
| | |
|---|---|
| *F16M 11/28* | (2006.01) |
| *F16M 11/10* | (2006.01) |
| *F16M 11/04* | (2006.01) |
| *F16M 11/32* | (2006.01) |
| *A47B 23/04* | (2006.01) |
| *H04M 1/04* | (2006.01) |
| *D06F 57/08* | (2006.01) |
| *A47F 7/24* | (2006.01) |
| *A47G 25/06* | (2006.01) |

(52) U.S. Cl.
CPC ........... *F16M 11/10* (2013.01); *F16M 11/041* (2013.01); *F16M 11/32* (2013.01); *A47B 2023/049* (2013.01); *A47F 7/24* (2013.01); *A47G 25/0664* (2013.01); *D06F 57/08* (2013.01); *H04M 1/04* (2013.01)

(58) Field of Classification Search
CPC ....... A47B 43/00; A47F 7/24; A47G 25/0664; A47G 25/0671; D06F 57/08; D06F 57/10; D06F 57/06
USPC ....... 248/688, 676, 447, 454, 455, 457, 460, 248/463, 464, 465, 469, 472, 370, 163.1, 248/163.2, 165, 167, 434, 168, 170, 172, 248/173, 440.1, 121, 125.8; 108/3; 211/85.24, 204, 206, 202, 203, 198
See application file for complete search history.

(56) References Cited

U.S. PATENT DOCUMENTS

| | | | | |
|---|---|---|---|---|
| 631,602 | A * | 8/1899 | Wood et al. | A45F 3/24 |
| | | | | 5/130 |
| 2,651,487 | A * | 9/1953 | Loock | E01F 9/688 |
| | | | | 182/181.1 |
| 2,924,414 | A * | 2/1960 | Tesdal | A01M 31/00 |
| | | | | 211/191 |
| 2,984,444 | A * | 5/1961 | Lewis | B66C 23/205 |
| | | | | 248/163.2 |
| 4,684,091 | A * | 8/1987 | Moreschi | F16M 11/046 |
| | | | | 211/182 |
| 4,690,363 | A * | 9/1987 | Koves | A47B 97/08 |
| | | | | 248/163.1 |

(Continued)

*Primary Examiner* — Terrell L McKinnon
*Assistant Examiner* — Michael McDuffie
(74) *Attorney, Agent, or Firm* — JCIPRNET

(57) ABSTRACT

A supporting device is configured to hold and support a portable electronic device. The supporting device includes a main shaft, a plurality of swing arms, a holder, and a plurality of adjustable legs. The portable electronic device is configured to lean against the main shaft. The swing arms are pivotally coupled to two opposite ends of the main shaft and configured to rotate relatively to the main shaft. The holder is configured to receive an edge of the portable electronic device. The swing arms are slidably connected to the holder for adjusting a distance between the main shaft and the holder through the rotating of the swing arms. The adjustable legs are pivotally coupled to the two opposite ends of the main shaft. The adjustable legs are independently movable in at least two degrees of freedom.

19 Claims, 8 Drawing Sheets

(56) References Cited

U.S. PATENT DOCUMENTS

| | | | | |
|---|---|---|---|---|
| 4,718,630 A * | 1/1988 | Richard | A47B 23/007 | |
| | | | 108/1 | |
| 5,207,405 A * | 5/1993 | Cobb | A47B 81/061 | |
| | | | 108/49 | |
| 5,681,018 A * | 10/1997 | Hoftman | A61G 13/101 | |
| | | | 248/125.8 | |
| 6,076,787 A * | 6/2000 | Troyer | A47B 23/04 | |
| | | | 248/166 | |
| 6,131,749 A * | 10/2000 | Crockett | B60R 7/10 | |
| | | | 211/105.3 | |
| 6,161,807 A * | 12/2000 | Steiner | F16M 11/046 | |
| | | | 182/181.1 | |
| 6,282,084 B1 * | 8/2001 | Goerdt | F16M 11/16 | |
| | | | 108/115 | |
| 6,796,536 B1 * | 9/2004 | Sevier, IV | A47B 23/046 | |
| | | | 248/121 | |
| 7,000,877 B2 * | 2/2006 | Wang | D06F 57/06 | |
| | | | 108/181 | |
| 7,118,084 B2 * | 10/2006 | Park | A47B 97/08 | |
| | | | 248/460 | |
| 7,530,543 B1 * | 5/2009 | Kremzar | A47B 97/02 | |
| | | | 160/24 | |
| 7,543,790 B2 * | 6/2009 | Starcher | A47B 97/08 | |
| | | | 248/163.1 | |
| 7,677,519 B2 * | 3/2010 | Gauer | A47B 23/007 | |
| | | | 248/284.1 | |
| 7,744,046 B1 * | 6/2010 | Lundy | B60R 11/02 | |
| | | | 248/121 | |
| 8,272,602 B2 * | 9/2012 | Ye | F16M 11/046 | |
| | | | 248/122.1 | |
| 8,526,802 B1 * | 9/2013 | Starns | G03B 17/561 | |
| | | | 248/464 | |
| 9,027,900 B2 * | 5/2015 | Prohofsky | F16M 11/041 | |
| | | | 248/449 | |
| 2004/0144907 A1 * | 7/2004 | Hovde | A47B 23/04 | |
| | | | 248/461 | |
| 2005/0029415 A1 * | 2/2005 | Ma | F16M 11/046 | |
| | | | 248/166 | |
| 2007/0012827 A1 * | 1/2007 | Fu | A47B 23/007 | |
| | | | 248/464 | |
| 2008/0029473 A1 * | 2/2008 | Hu | A47G 25/0664 | |
| | | | 211/206 | |
| 2014/0060393 A1 * | 3/2014 | Fan | F16M 11/14 | |
| | | | 108/3 | |

* cited by examiner

SUPPORTING DEVICE

CROSS-REFERENCE TO RELATED APPLICATION

This application claims the priority benefit of U.S. provisional application Ser. No. 62/700,784, filed on Jul. 19, 2018. The entirety of the above-mentioned patent application is hereby incorporated by reference herein and made a part of this specification.

BACKGROUND

Technical Field

The present disclosure generally relates to a supporting device. More particularly, the present disclosure relates to a supporting device configured to hold and support a portable electronic device.

Description of Related Art

Electronic device such as laptop computers and other telecommunications and electronic media devices are becoming increasingly portable, powerful, and affordable. Not surprisingly, the popularity of such devices has skyrocketed, as has the desire to rely on them increasingly for work, entertainment, and other purposes in a variety of traditional and non-traditional locations. For example, users may desire to surf the internet, watch movies, or compose documents as they lie in a comfortable position that supports their neck and head while in bed or in outdoor settings. Using these devices while sitting, reclining, or lying supine requires that the device be supported in an appropriate position to be viewable and operable by the user.

Accordingly, a wide variety of stands have been developed to hold a laptop computer, other electronic device in a position to be used by a person in a reclining or supine position. Such stands typically comprise a table portion for appropriately supporting the laptop or tablet PC and legs that are configured to support the table portion while the user reclines or lies supine. The stand's table portion may be of a static configuration or may be adjustable, especially with regard to the tilt of the table portion.

However, what the existing stands fail to take into account is the very common situation that the surface on which the user is lying may not be flat and/or may not be solid enough to provide uniform support to the legs of stand. This is especially unfortunate for stands that are otherwise easily portable, because such stands may induce a user to believe that they are usable "anywhere," whereas their use in many common settings may prove problematic.

For example, users who choose to read, view, or work while in bed need a device that can reliably support their smartphone or laptop device, no matter the surface. Hospital patients need a support device that will accommodate the presence of casts, other equipment, cushions, and the like on the bed as well as the existence of other special circumstances that may not allow for a solid, uniform, flat surface on which to support the stand. Users who share a bed with another person may desire a support device whose legs can comfortably accommodate the other person. Users who wish to use their devices while lying outdoors may encounter problems if their chosen spot does not have a solid and uniformly flat surface on which to reliably support the legs of currently available stands. Moreover, the legs of the existing support devices are usually fixed and oriented such that a person using the support has to use the device while lying on their back. This represents an inconvenience for users who wish to use a stand while lying on their side.

All of these common situations point to a need for a more adjustably supported stand for reliably holding a laptop, or other electronic device in a variety of positions.

SUMMARY

Accordingly, the present disclosure is directed to a supporting device configured to hold and support a portable electronic device on any even or uneven surface with variety of view angles according to a position of a user.

The present disclosure is directed to a supporting device configured to hold and support a portable electronic device. The supporting device includes a main shaft, a plurality of swing arms, a holder, and a plurality of adjustable legs. The portable electronic device is configured to lean against the main shaft. The swing arms are coupled to the main shaft and configured to rotate relatively to the main shaft. The holder is configured to receive an edge of the portable electronic device. The swing arms are coupled to the holder for adjusting a distance between the main shaft and the holder through the rotating of the swing anus. The adjustable legs are pivotally coupled to the two opposite ends of the main shaft. The adjustable legs are independently movable in at least two degrees of freedom.

According to an embodiment of the present disclosure, the supporting device further includes at least one gripper movably disposed on the main shaft and configured to grip at least one side of the portable electronic device.

According to an embodiment of the present disclosure, the at least one gripper includes a plurality of grippers sliding along the main shaft and configured to grip two opposite sides of the portable electronic device.

According to an embodiment of the present disclosure, each of the grippers includes a plurality of slots, and the main shaft is configured to be sleeved in one of the slots.

According to an embodiment of the present disclosure, the holder includes a sliding rail, the swing arms configured to slide along the sliding rail while rotating relatively to the main shaft.

According to an embodiment of the present disclosure, the holder further includes a plurality of sliders configured to slide relatively to one another through a sliding joint, each of the sliders includes a protrusion extended through the sliding rail and coupled to each of the swing arms.

According to an embodiment of the present disclosure, the holder further includes a holder body including a groove for receiving the edge of the portable electronic device.

According to an embodiment of the present disclosure, the holder further includes a stopper pivotally coupled to the holder body to rotate to a folding position for folding with the holder body and a holding position for holding the edge of the portable electronic device.

According to an embodiment of the present disclosure, the supporting device further includes a plurality of rotating joints disposed at the two opposite ends of the main shaft to pivotally connect the adjustable legs to the two opposite ends of the main shaft.

According to an embodiment of the present disclosure, each of the rotating joints includes a biaxial pivot joint.

According to an embodiment of the present disclosure, each of the rotating joints includes a first pivot shaft and a second pivot shaft. The first pivot shaft is coupled to one of the two opposite ends of the main shaft. An axial direction of the first pivot shaft is substantially perpendicular to the axial direction of the main shaft. The second pivot shaft is coupled between the first pivot shaft and the adjustable legs. An axial direction of the first pivot shaft is substantially perpendicular to the axial direction of the second pivot shaft.

According to an embodiment of the present disclosure, each of the rotating joints includes a universal joint.

According to an embodiment of the present disclosure, each of the rotating joints includes a ball cap and a ball member. The ball cap is coupled to one of the two opposite ends of the main shaft. The ball member is coupled between the ball cap and the adjustable legs.

According to an embodiment of the present disclosure, each of the adjustable legs includes a plurality of telescoping fixed and sliding leg members for adjusting the adjustable legs to a desired length.

According to an embodiment of the present disclosure, the adjustable legs includes two sets of the adjustable legs pivotally coupled to the two opposite ends of the main shaft respectively, and each set includes two adjustable legs.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
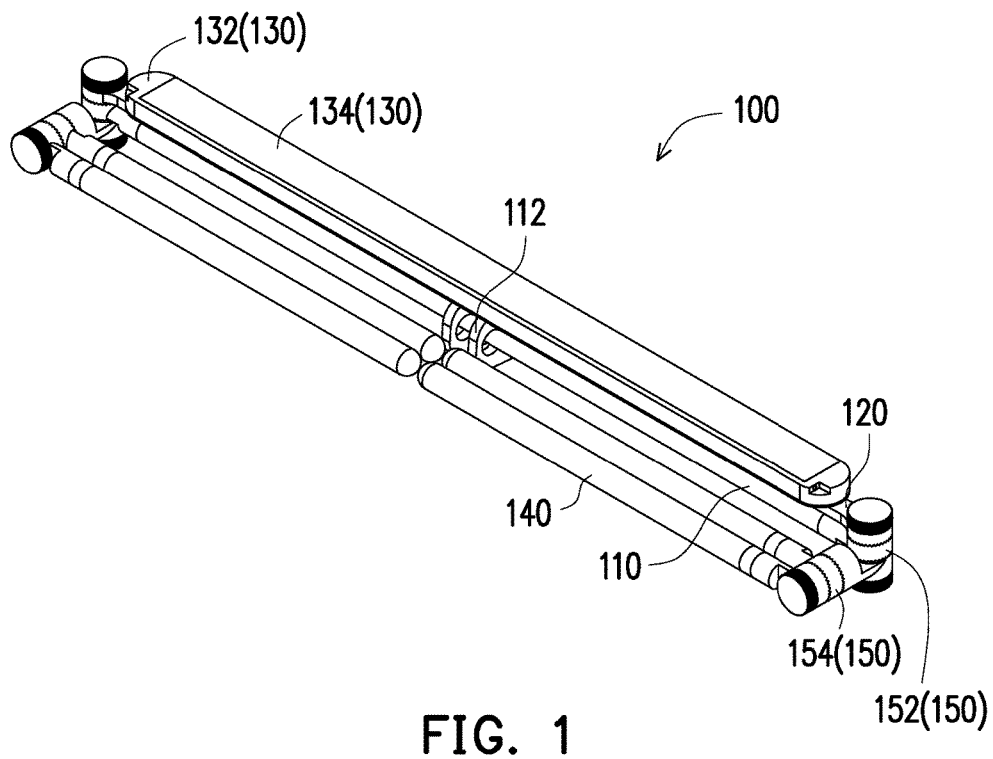
FIG. 1 illustrates a schematic view of a supporting device in a folding state according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. The terms used herein such as "on", "above", "below", "front", "back", "left" and "right" are for the purpose of describing directions in the figures only and are not intended to be limiting of the disclosure. Further, in the discussion and claims herein, the term "on" used with respect to two materials, one "on" the other, means at least some contact between the materials, while "over" and "overlie" mean the materials are in proximity, but possibly with one or more additional intervening materials such that physical contact is possible but not required. Neither "on" nor "over" implies any directionality as used herein.

Unless limited otherwise, the terms "disposed", "connected", "coupled", "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Accordingly, the drawings and descriptions will be regarded as illustrative in nature and not as restrictive.

Figure 2:
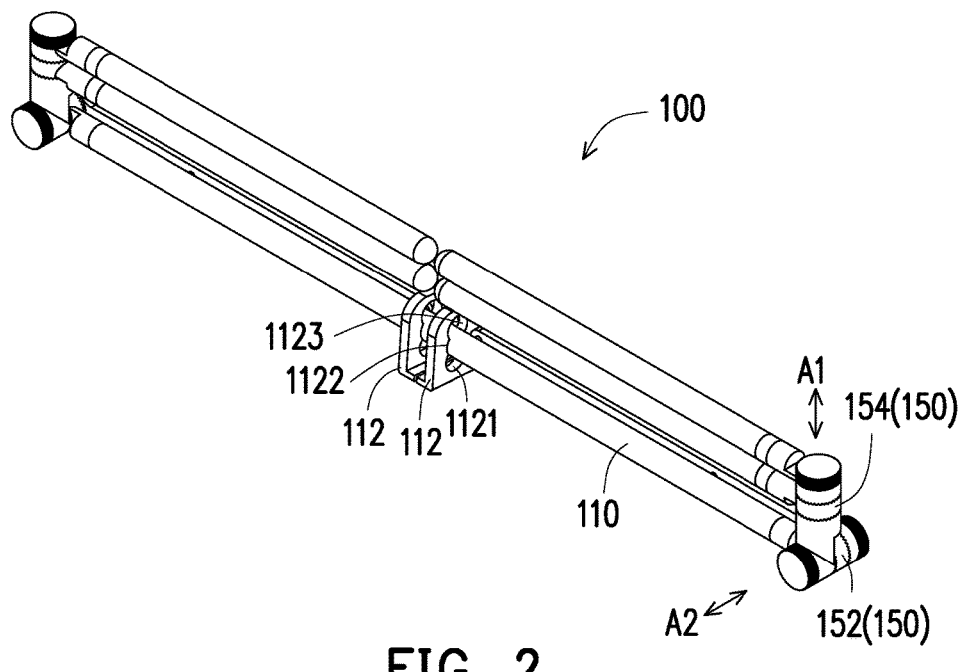
FIG. 2 illustrates the supporting device in FIG. 1 in different angle.
Figure 3:
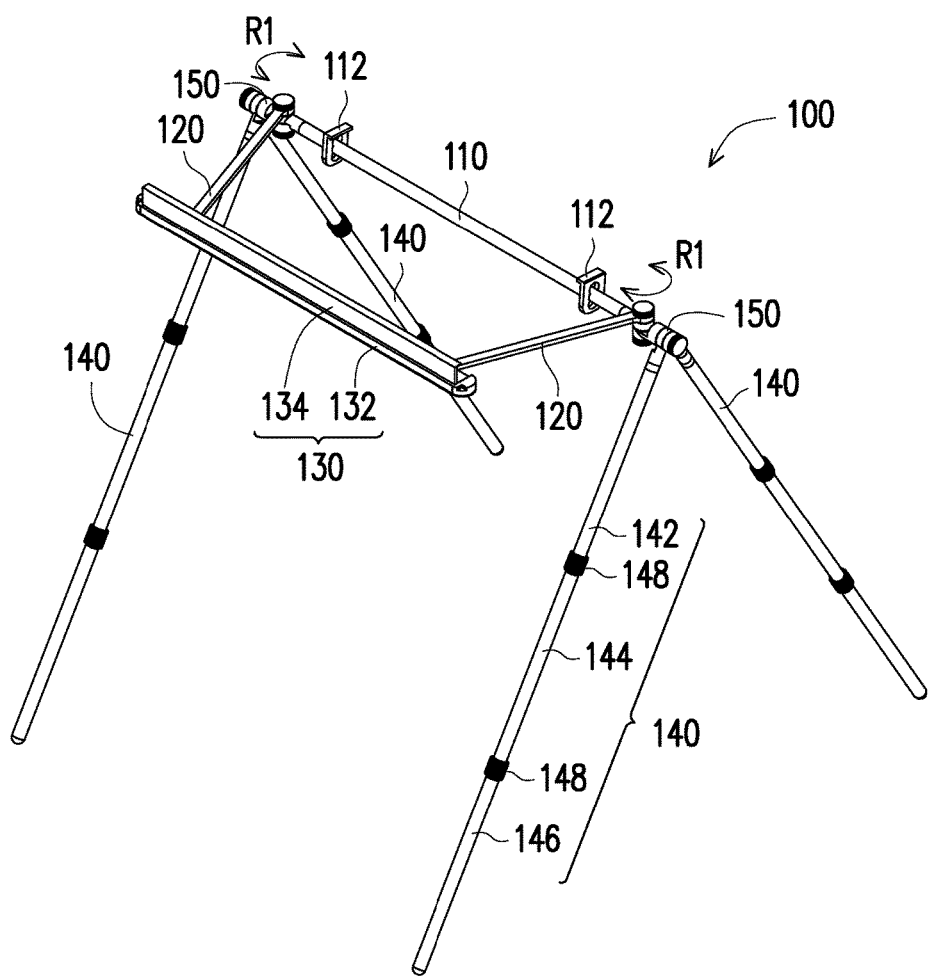
FIG. 3 illustrates a schematic view of a supporting device in a working state according to an exemplary embodiment of the disclosure.

FIG. 1 illustrates a schematic view of a supporting device in a folding state according to an exemplary embodiment of the disclosure. FIG. 2 illustrates the supporting device in FIG. 1 in different angle. FIG. 3 illustrates a schematic view of a supporting device in a working state according to an exemplary embodiment of the disclosure. With reference now to FIG. 1 to FIG. 3, in some embodiments, a supporting device 100 is configured to hold and support a portable electronic device (e.g. the portable electronic device 200 shown in FIG. 6 to FIG. 9). The portable electronic device 200 may be a laptop computer, a tablet PC, a smartphone, etc. In other words, the supporting device 100 is configured to hold and support different kinds of the portable electronic devices 200 with different sizes. When not in use, the supporting device 100 can be folded in a folding state as it is shown in FIG. 1 and FIG. 2, so the supporting device 100 is easy to be carried around by a user.

Figure 6:
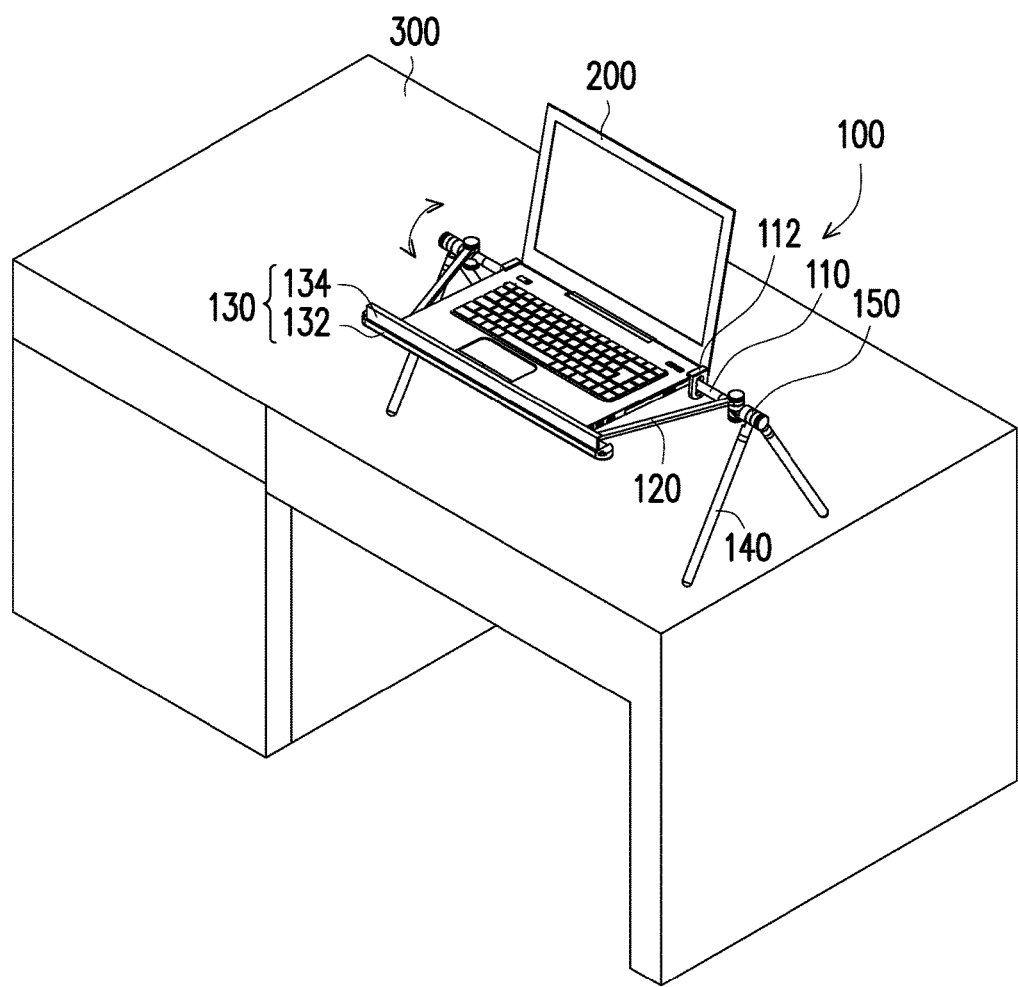
FIG. 6 to FIG. 9 illustrate schematic views of a supporting device in different working state according to some exemplary embodiments of the disclosure.

In some embodiments, the supporting device 100 may include a main shaft 110, a plurality of swing arms 120, a holder 130, and a plurality of adjustable legs 140. The portable electronic device 200 is configured to lean against the main shaft 110. In the present embodiment, an upper portion of the back surface of the portable electronic device 200 may be leaned against the main shaft 110. In some embodiments, the supporting device 100 may further include at least one gripper 112, which is movably disposed on the main shaft 110 and configured to grip at least one side of the portable electronic device 200. In the present embodiments, two grippers 112 are illustrated for gripping two opposite sides of the portable electronic device 200 as it is shown in FIG. 6, so as to fix the portable electronic device 200 onto the main shaft 110. However, the embodiment is merely for illustration, and the disclosure does not limit the number of the grippers 112.

With reference now to FIG. 6, in the embodiment of the portable electronic device 200 being a laptop computer including a display body and a keyboard body, the upper portion of the keyboard body (the portion close to the pivot mechanism for connecting the display body) can be leaned against the main shaft 110 and gripped by the grippers 112 as it is shown in FIG. 6. In the embodiment of the portable electronic device 200 being a tablet PC or a smartphone with one integrated body, the back surface of the upper portion of the body may be leaned against the main shaft 110 and two opposite sides of the upper portion may be gripped by the grippers 112.

In some embodiments, the grippers 112 may be sleeved on the main shaft 110 to slide along the main shaft, such that the positions of the grippers 112 can be adjusted according to the size of the portable electronic device 200. In one of the implementations, each of the grippers 112 may include a plurality of slots 1121, 1122, 1123 (three slots are illustrated herein but is not limited thereto) as it is shown in FIG. 2. Each of the slots 1121, 1122, 1123 is conformal with the main shaft 110, such that the main shaft 110 is suitable for being sleeved in one of the slots 1121 according to the thickness of the portable electronic device 200. For example, the main shaft 110 may be sleeved in the slot 1121 when the portable electronic device 200 is thinner since the slot 1121 is closer to the clamp of the gripper 112. The gripper 112 may be made of flexible material such as rubber, silicone, or the like, so as to grip the portable electronic device 200 tightly without damaging the portable electronic device 200.

With reference now to FIG. 3, in some embodiments, the swing arms 120 are pivotally coupled to two opposite ends of the main shaft 110 and configured to rotate along a rotating direction R1 relatively to the main shaft 110. The holder 130 is configured to receive an edge (e.g. the lower edge) of the portable electronic device. Accordingly, the swing arms 120 are slidably connected to the holder 130 for adjusting a distance between the main shaft 110 and the holder 130 through the rotating of the swing arms 120. For example, the swing arms 120 is configured to rotate between a folding position as it is shown in FIG. 1 and an extending position as it is shown in FIG. 3. When the swing arms 120 is at the folding position, the swing arms 120 is folded and in contact with the main shaft 110. When the swing arms 120 is at the extending position, a distal end of the swing arms 120 is rotated away from the main shaft 110, such that the holder 130 maintains a distance from the main shaft 110 for holding the lower edge of the portable electronic device 200.

In some embodiments, the adjustable legs 140 are pivotally coupled to the two opposite ends of the main shaft 110, and the adjustable legs 140 are independently movable in at least two degrees of freedom, so as to allow the user to independently position each of the adjustable legs 140 in a desired orientation to thereby facilitate use of the portable electronic device 200 on the supporting device 100 when the supporting device 100 is positioned on uneven surfaces.

Figure 4:
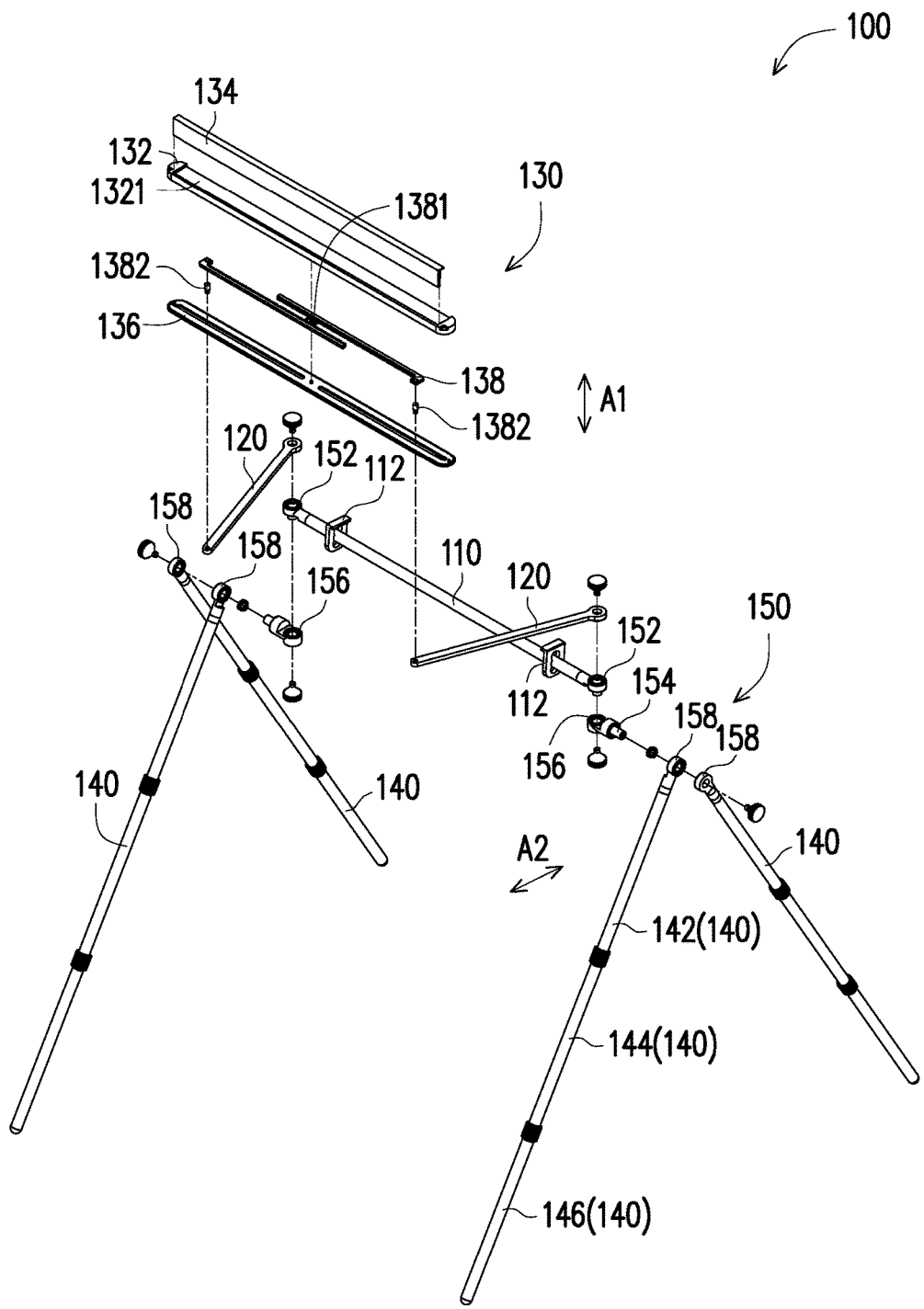
FIG. 4 illustrates an exploded view of a supporting device according to an exemplary embodiment of the disclosure.

FIG. 4 illustrates an exploded view of a supporting device according to an exemplary embodiment of the disclosure. With reference now to FIG. 4, in some embodiments, the holder 130 may further include a holder body 132 and a stopper 134. The stopper 134 is pivotally coupled to the holder body 132 to rotate between a folding position for folding with the holder body 132 as it is shown in FIG. 1 and a holding position for holding the (lower) edge of the portable electronic device as it is shown in FIG. 3. In some embodiments, the holder body 132 may include a groove 1321. With such arrangement, when the stopper 134 is at the folding position, the groove 1321 is configured for receiving the stopper 134, and when the stopper 134 is at the holding position, the groove 1321 is configured for receiving the portable electronic device 200 as it is shown in FIG. 6.

With reference now to FIG. 4, in some embodiments, the holder 130 may further include a sliding rail 136. The swing arms 120 are configured to slide along the sliding rail 136 while rotating relatively to the main shaft 110. In detail, the holder 130 may further include a plurality of sliders 138 configured to slide relatively to one another through a sliding joint 1381, which may be fixed to a center of the sliding rail 136. Each of the sliders 138 includes a protrusion 1382 extended through the sliding rail 138, such that the sliders 138 can slide relatively to one another along the sliding rail 136. The sliders 138 are coupled to the distal end of the swing arms 120 respectively, such that the distal end of the swing arms 120 can slide relatively to one another along the sliding rail 136 when the swing arms 120 rotate between the folding position and the extended position.

In some embodiments, the swing anus 120 may be slidably connected to the main shaft 110, and the holder 130 may be pivotally coupled to the swing arms 120, so that the swing arms 120 are configured to slide along the main shaft 110 and rotate relatively to the holder 130 for adjusting the distance between the main shaft 110 and the holder 130 through the rotating of the swing arms 120. In other embodiments, the swing arm 120 may be slidably connected to both the main shaft 110 and the holder 130, so the swing arms 120 are configured to slide along both the main shaft 110 and the holder 130 to adjust the distance between the main shaft 110 and the holder 130. In some embodiments, the supporting device 100 may include more than two swing arms 120 on each side of the main shaft to create extendable/retractable mechanism. For example, the swing arms 120 may be a scissors extension mechanism. In other words, the swing arms 120 may be arranged in a scissors form to drive the holder 130 toward or away from the main shaft 110.

In some embodiments, the supporting device 100 further includes a plurality of rotating joints 150 disposed at the two opposite ends of the main shaft 110 to pivotally connect the adjustable legs 140 to the two opposite ends of the main shaft 110. In one of the implementations, each of the rotating joints 150 includes a biaxial pivot joint as it is shown in FIG. 4. In the present embodiment, each of the rotating joints 150 includes a first pivot shaft 152, a second pivot shaft 154, a first gear 156, and a second gear 158. The first pivot shafts 152 are coupled to two opposite ends of the main shaft 110. An axial direction A1 of the first pivot shaft 152 is substantially perpendicular to an axial direction of the main shaft 110. The first gear 156 is sleeved on the first pivot shaft 152 and connected to the second pivot shaft 154, so as to rotate about the axial direction A1. The second pivot shaft 154 is coupled between the first pivot shaft 152 and the adjustable legs 140. An axial direction A1 of the first pivot shaft 152 is substantially perpendicular to an axial direction A2 of the second pivot shaft 154. The second gear is sleeved on the second pivot shaft 154, so as to rotate about the axial direction A2.

In the present embodiment, the adjustable legs 140 includes two sets of the adjustable legs 140 pivotally coupled to the two opposite ends of the main shaft 110 respectively, and each set includes two adjustable legs 140. That is to say, each side of the main shaft 110 is configured with two adjustable legs 140. With such configuration, two second gears 158 on each side of the main shaft 110 are illustrated herein, but is not limited thereto. The second gears 158 are sleeved on the second pivot shaft 154, and coupled to the adjustable legs 140 respectively. With such arrangement, the adjustable legs 140 are capable of rotate about the axial directions A1 and A2 independently. Accordingly, the adjustable legs 140 are capable of moving (rotating) independently in at least two degrees of freedom. Certainly, the present embodiment is merely for illustration, and the disclosure does not limit the number of the adjustable legs 140.

In some embodiments, the adjustable legs 140 are configured to be detachably coupled to the two opposite ends of the main shaft 110 for storage. In other words, the adjustable legs 140 can be detached from the main shaft 110 when the supporting device 100 in the folding state, so the size of the supporting device 100 in the folding state can be more compact.

Figure 5:
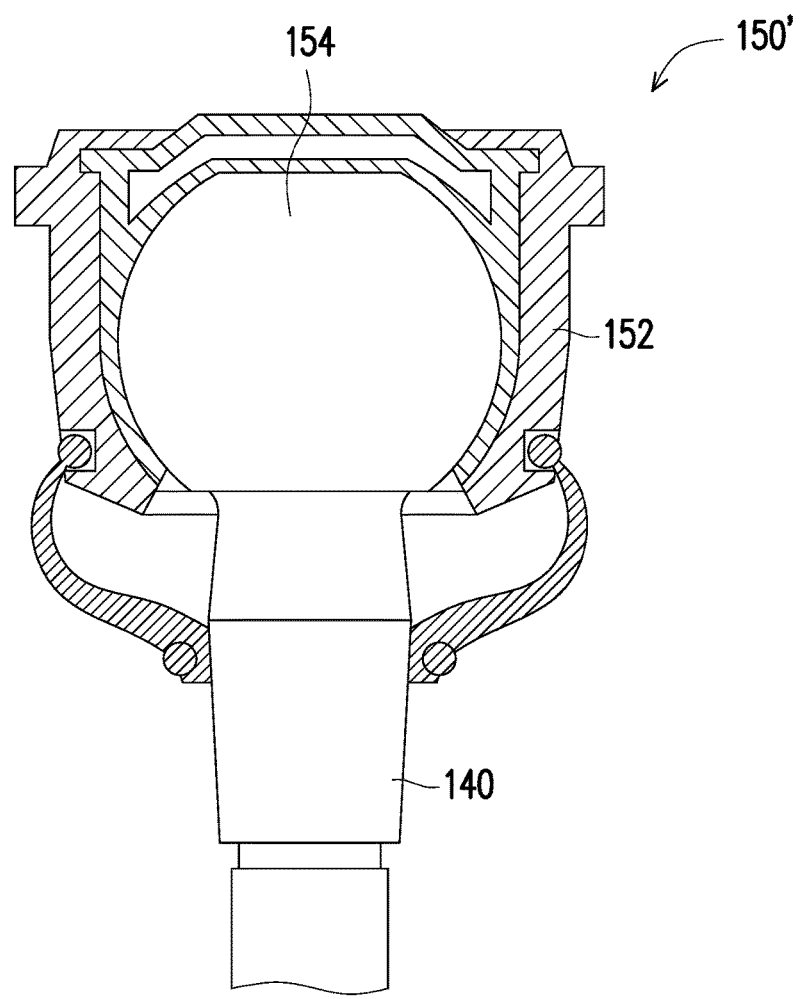
FIG. 5 illustrates a schematic view of a rotating joints of a supporting device according to an exemplary embodiment of the disclosure.

FIG. 5 illustrates a schematic view of a rotating joints of a supporting device according to an exemplary embodiment of the disclosure. It is noted that the structure shown in FIG. 5 contains many features same as or similar to the structure disclosed earlier with FIG. 1 to FIG. 4. For purpose of clarity and simplicity, detail description of same or similar features may be omitted, and the same or similar reference numbers denote the same or like components. The main differences between the structure shown in FIG. 5 and the structure shown in FIG. 4 are described as follows.

With reference now to FIG. 5, in the present embodiment, each of the rotating joints 150' may be a universal joint, which is capable of moving (rotating) in three degrees of freedom. For example, each of the rotating joints 150' includes a ball cap 152 and a ball member 154. The ball caps 152 are coupled to two opposite ends of the main shaft 110. The ball members 154 are coupled between the ball cap 152 and the adjustable legs 140. With such arrangement, the adjustable legs 140 connected to the ball members 154 are capable of rotate within the ball caps 152 respectively, so the adjustable legs 140 can move (rotate) in three degrees of freedom. It is noted that the embodiments described above is merely for illustration and is not intended to limit the disclosure. The rotating joints may also include Hirth coupling, serrated discs, spline shaft coupling, friction plates, or adjustable angle plates that contain an array of mounting holes (with locking pin). It is understood that the rotating joints in the embodiments are merely for illustration, and the disclosure does not limit the formation of the rotating joints as long as the adjustable legs 140 can move (rotate) independently and relatively to the main shaft 110 in at least two degrees of freedom through the rotating joints.

With now reference to FIG. 4, each of the adjustable legs 140 may be a telescoping leg. In other words, each of the adjustable legs 140 may include a plurality of telescoping fixed and sliding leg members 142, 144, and 146 (three members are illustrated herein, but not limited thereto) sleeved on one another for sliding relatively to one another to adjust the adjustable legs 140 to a desired length. For example, a plurality of locking mechanisms may be disposed between any two adjacent telescoping fixed and sliding leg members 142, 144, and 146, so as to lock the relative position of the two adjacent members 142, 144, and 146 according to the desired length. In some embodiments, the desired length of each of the adjustable legs 140 can be adjusted by connecting at least one extensional segment thereto. In other words, the adjustable legs 140 may include a plurality of extensional segments (e.g. the extensional segments 142, 144, and 146) configured to be detachably connected to one another, so that the adjustable legs 140 can be built up to the desired length.

FIG. 6 to FIG. 9 illustrate schematic views of a supporting device in different working state according to some exemplary embodiments of the disclosure. With now reference to FIG. 6, in the present embodiment, the supporting device 100 is disposed on an even surface such as a desk 300 to hold the portable electronic device 200. In the present embodiment, the adjustable legs 140 may be adjusted to the same length (e.g. the shortest length), and the main shaft 110 may rotate relatively to the adjustable legs 140 to adjust the portable electronic device 200 to a desired angle.

Figure 7:
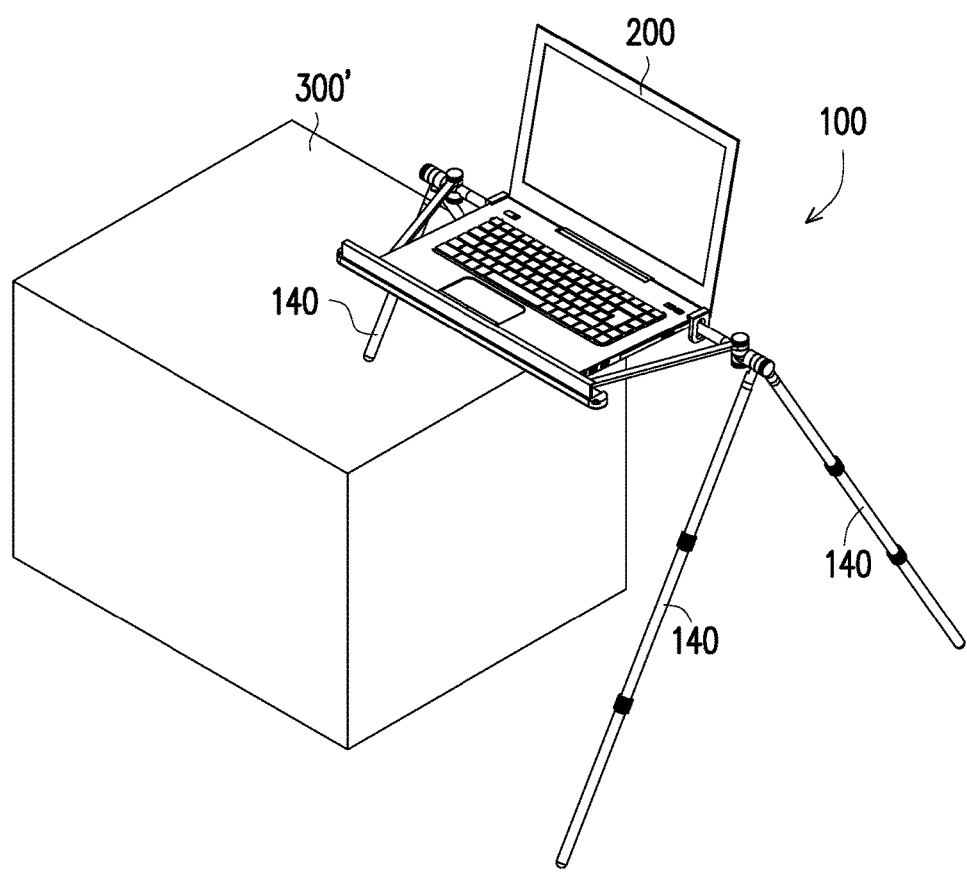

With now reference to FIG. 7, in the present embodiment, the supporting device 100 is disposed on an uneven surface. For example, one set of the adjustable legs 140 are disposed on a sofa 300' while another set of the adjustable legs 140 are disposed on the floor. In this case, the set of the adjustable legs 140 disposed on the sofa 300' and the set of the adjustable legs 140 disposed on the floor may be adjusted to different lengths to adapt the uneven surface. For example, the set of the adjustable legs 140 disposed on the sofa 300' may be adjusted to, for example, their shortest lengths, while the other set of the adjustable legs 140 disposed on the floor may be adjusted to, for example, their longest lengths. In other embodiments, the lengths of the adjustable legs 140 may be adjusted to be different from one another according to the uneven surface. In addition, the height and orientation of the supporting device 100 can also be adjusted by adjusting the angle included between the adjustable legs 140 and the main shaft 110. For example, if the user rotate the adjustable legs 140 to increase the angle included between the adjustable legs 140 and the main shaft 110, the height and orientation of the supporting device 100 can be lower. Also, if the user merely rotate the adjustable legs 140 on one side of the main shaft 110 or rotate the adjustable legs 140 on two sides of the main shaft 110 to different degrees, the orientation of the supporting device 100 may be tilted to adapt the uneven surface.

Figure 8:
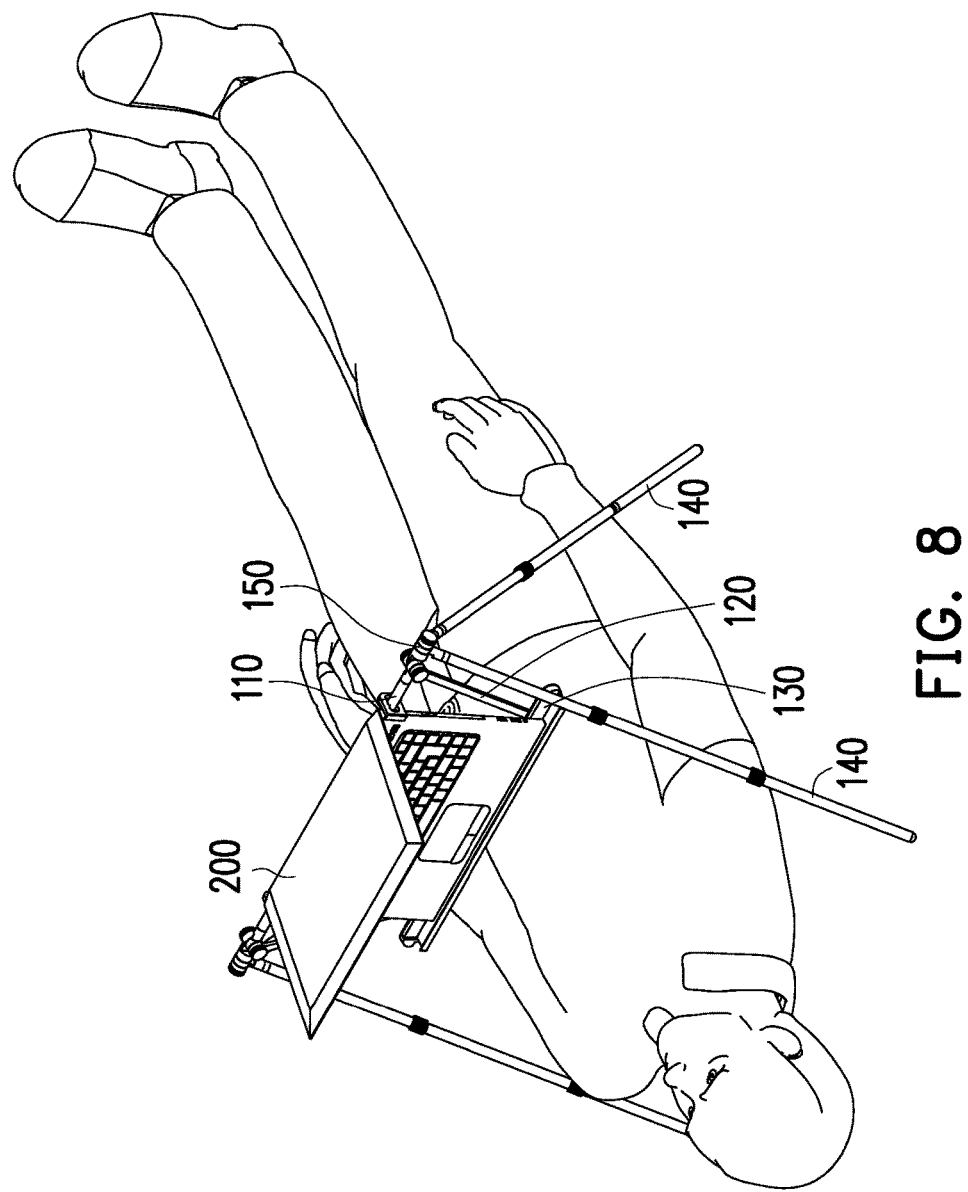
Figure 9:
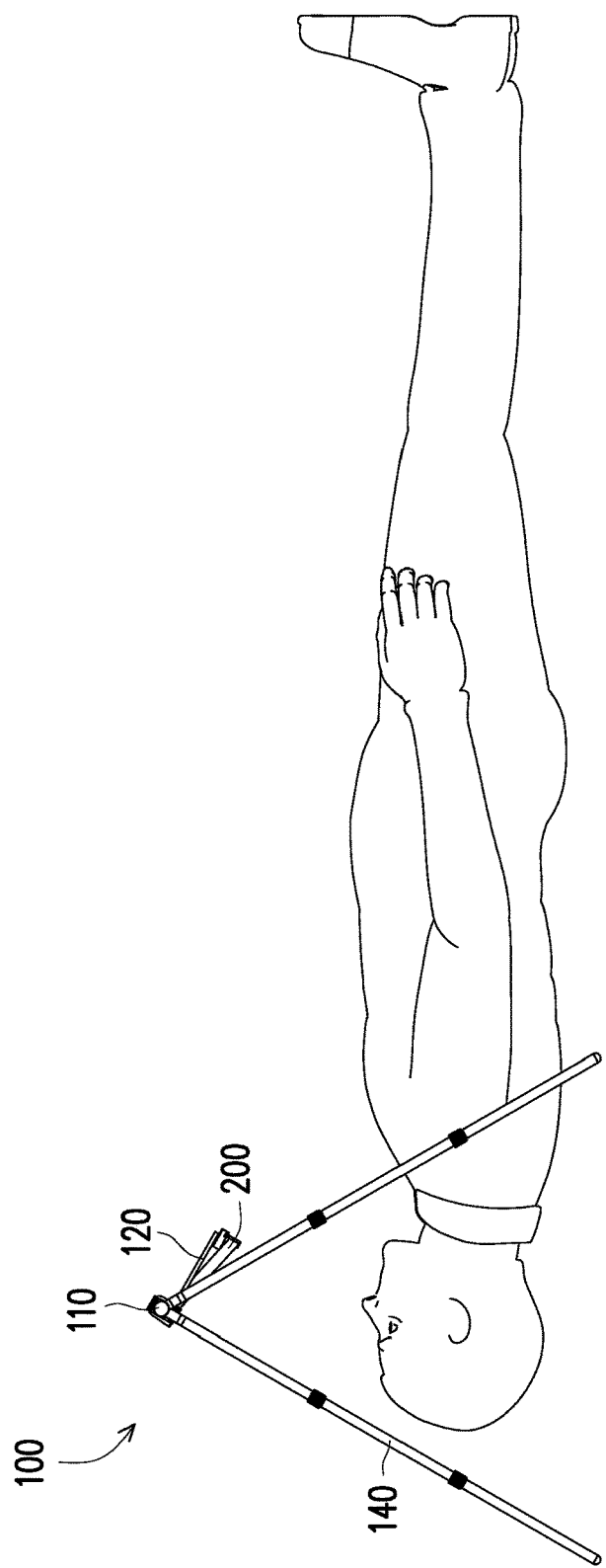

With now reference to FIG. 8 and FIG. 9, in the present embodiment, when the user would like to use the portable electronic device 200 while lying in a supine position, the supporting device 100 may be disposed on a bed in bed, a couch or other surface the user lying thereon, and the main shaft 110 may rotate relatively to the adjustable legs 140 through the rotating joints 150 to adjust the portable electronic device 200 to a desired angle as it is shown in FIG. 8 and FIG. 9. It is noted that FIG. 8 illustrates the embodiment of the portable electronic device 200 being a laptop computer and FIG. 9 illustrates the embodiment of the portable electronic device 200 being a smartphone, but the disclosure does not limit thereto. Since the portable electronic device 200 is directly leaned against the main shaft 110 or hold by the grippers 112 disposed on the main shaft 110, the view angle of the user would not be blocked by the supporting device 100 even when the user is lying in a supine position.

With such configuration, the swing arms 120 are slidably connected to the holder 130 for adjusting a distance between the main shaft 110 and the holder 130 through the rotating of the swing arms 120. Accordingly, when the swing arms 120 is at the folding position, the swing arms 120 is folded and in contact with the main shaft 110. When the swing arms 120 is at the extending position, the holder 130 maintains a distance from the main shaft 110 for holding the edge of the portable electronic device 200. With such arrangement, the distance between the main shaft 110 and the holder 130 may be adjusted by pulling the holder 130 away from the main shaft 110, such that the supporting device 100 can hold the portable electronic device 200 with different sizes. Moreover, since the swing arms 120 and the adjustable legs 140 are directly disposed on the main shaft 110, the size of the supporting device 100 can be more compact, the assembling process can be simplified, and the structure stability can be further improved.

In addition, the independent adjustability of the adjustable legs 140, both in their length and also in their angle with respect to the main shaft 110, allow the user to position each of the adjustable legs 140 in a desired orientation and on any surfaces (including even and uneven surfaces). The user also has the ability to adjust the supporting device 100 through a wide range of desired angles. Therefore, the disclosure enhances the flexibility of the supporting device 100, so the user can easily position the supporting device 100, with the portable electronic device 200 attached thereon, in any desired orientation that provides the greatest comfort to the individual user.

Based on the above discussions, it can be seen that the present disclosure offers various advantages. It is understood, however, that not all advantages are necessarily discussed herein, and other embodiments may offer different advantages, and that no particular advantage is required for all embodiments.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A supporting device, configured to hold and support a portable electronic device, comprising: a main shaft, where the portable electronic device is configured to lean against the main shaft; a plurality of swing arms coupled to the main shaft and configured to rotate relatively to the main shaft; a holder configured to receive an edge of the portable electronic device, wherein the swing arms coupled to the holder for adjusting a distance between the main shaft and the holder through the rotating of the swing arms; and a plurality of adjustable legs pivotally coupled to the two opposite ends of the main shaft, wherein the adjustable legs are independently movable in at least two degrees of freedom, further comprising at least one gripper movably disposed on the main shaft and configured to grip at least one side of the portable electronic device.

2. The supporting device as claimed in claim 1, wherein the at least one gripper comprises a plurality of grippers sliding along the main shaft and configured to grip two opposite sides of the portable electronic device.

3. The supporting device as claimed in claim 2, wherein each of the grippers comprises a plurality of slots, and the main shaft is configured to be sleeved in one of the slots.

4. The supporting device as claimed in claim 1, wherein the holder comprises a sliding rail, the swing arms configured to slide along the sliding rail while rotating relatively to the main shaft.

5. The supporting device as claimed in claim 4, wherein the holder further comprises a plurality of sliders configured to slide relatively to one another through a sliding joint, each of the sliders comprises a protrusion extended through the sliding rail and coupled to each of the swing arms.

6. The supporting device as claimed in claim 1, wherein the holder further comprises a holder body comprising a groove for receiving the edge of the portable electronic device.

7. The supporting device as claimed in claim 6, wherein the holder further comprises a stopper pivotally coupled to the holder body to rotate between a folding position for folding with the holder body and a holding position for holding the edge of the portable electronic device.

8. The supporting device as claimed in claim 1, further comprising a plurality of rotating joints disposed at the two opposite ends of the main shaft to pivotally connect the adjustable legs to the two opposite ends of the main shaft.

9. The supporting device as claimed in claim 8, wherein each of the rotating joints comprises a biaxial pivot joint.

10. The supporting device as claimed in claim 8, wherein each of the rotating joints comprises:
   a first pivot shaft coupled to one of the two opposite ends of the main shaft, wherein an axial direction of the first pivot shaft is substantially perpendicular to an axial direction of the main shaft; and
   a second pivot shaft coupled between the first pivot shaft and the adjustable legs, wherein an axial direction of the first pivot shaft is substantially perpendicular to an axial direction of the second pivot shaft.

11. The supporting device as claimed in claim 8, wherein each of the rotating joints comprises a universal joint.

12. The supporting device as claimed in claim 8, wherein each of the rotating joints comprises:
   a ball cap coupled to one of the two opposite ends of the main shaft; and
   a ball member coupled between the ball cap and the adjustable legs.

13. The supporting device as claimed in claim 1, wherein each of the adjustable legs comprises a plurality of telescoping fixed and sliding leg members for adjusting the adjustable legs to a desired length.

14. The supporting device as claimed in claim 13, wherein the telescoping fixed and sliding leg members are sleeved on one another to slide relatively to one another.

15. The supporting device as claimed in claim 1, each of the adjustable legs further comprises a plurality of locking mechanisms disposed between any two adjacent telescoping fixed and sliding leg members to lock a relative position of the two adjacent telescoping fixed and sliding leg members.

16. The supporting device as claimed in claim 1, wherein the adjustable legs comprises two sets of the adjustable legs pivotally coupled to the two opposite ends of the main shaft respectively, and each set comprises two adjustable legs.

17. The supporting device as claimed in claim 1, wherein the swing arms are pivotally coupled to two opposite ends of the main shaft.

18. The supporting device as claimed in claim 1, wherein the swing arms slidably connected to the holder.

19. The supporting device as claimed in claim 1, wherein the adjustable legs are configured to be detachably coupled to the two opposite ends of the main shaft.

* * * * *